United States Patent
Christensen et al.

(10) Patent No.: US 6,920,411 B2
(45) Date of Patent: Jul. 19, 2005

(54) METHOD FOR CONFIGURING AN OPERATIONAL CHARACTERISTIC OF A PROXIMITY SENSOR

(75) Inventors: Timothy A. Christensen, Camano Island, WA (US); John Eugene Fulmer, Granite Falls, WA (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/727,884

(22) Filed: Dec. 4, 2003

(65) Prior Publication Data

US 2005/0125192 A1 Jun. 9, 2005

(51) Int. Cl.[7] .................... G06F 15/00; G01B 7/14; G08B 13/26
(52) U.S. Cl. .......... 702/150; 250/227.17; 324/207.12; 324/207.26; 340/562; 702/52
(58) Field of Search .................. 702/51, 150, 187, 702/52; 324/204, 207.12, 207.16, 207.26; 250/227.17; 73/862.331, 862.335, 862.336; 340/562

(56) References Cited

U.S. PATENT DOCUMENTS

| | | | | |
|---|---|---|---|---|
| 4,843,259 A | * | 6/1989 | Weisshaupt | 327/510 |
| 6,014,022 A | * | 1/2000 | Demma et al. | 324/207.12 |
| 6,025,711 A | * | 2/2000 | Demma et al. | 324/207.26 |
| 6,348,862 B1 | * | 2/2002 | McDonnell et al. | 340/562 |
| 6,650,111 B2 | * | 11/2003 | Christensen | 324/207.26 |

* cited by examiner

*Primary Examiner*—Bryan Bui
*Assistant Examiner*—John Le
(74) *Attorney, Agent, or Firm*—Marvin L. Union

(57) ABSTRACT

A proximity sensor has a resonant circuit which when stimulated by a pulse produces a signal with decaying oscillations. The number of such oscillations above a signal threshold varies in relation to the distance between a metal object and the proximity sensor. The sensor operation is configured by deriving a function that defines how the performance of a given proximity sensor deviates from performance reference data. The function is employed to normalize the count of oscillations produced by the given proximity sensor and the normalized count is used to determine presence of an object. By normalizing sensor performance, common configuration data can be used to setup a given proximity sensor without having to take into account specific performance variations of that sensor.

20 Claims, 4 Drawing Sheets

METHOD FOR CONFIGURING AN OPERATIONAL CHARACTERISTIC OF A PROXIMITY SENSOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to devices for detecting the presence of an object, and more particularly to normalizing performance characteristics of such sensors to facilitate replacement of one sensor with another sensor.

2. Description of the Related Art

Proximity sensors are commonly used along assembly lines to detect the presence of a workpiece passing nearby. The presence of a workpiece activates equipment that perform manufacturing operations.

U.S. Pat. No. 6,650,111 discloses an inductive proximity sensor for detecting presence of a metal object. The proximity sensor includes a drive circuit connected to a transducer coil to generate an oscillating signal. That signal changes when a metal object is adjacent to the transducer coil and a characteristic of the oscillations changes in response to the distance between the metal object and the transducer coil. A processing circuit detects that characteristic of the oscillations to produce an indication of the presence of an object.

In this type of proximity sensor, a resonant circuit is excited by a short duration voltage pulse, after which the resonant circuit is allowed to ring down whereby the oscillations decay exponentially. The rate of the exponential signal decay is proportional to the quality factor Q of the resonant circuit, which varies in relation to the distance to a metal object. Thus the number of peaks of the decaying signal that exceed a predefined level can be used to indicate the presence of a metal object within a given distance from the sensor. A particular model of proximity sensor is designed to emit an active output signal, indicating the object's presence, when the pulse count is within a predefined range of values.

The performance characteristics of the resonant circuit and the proximity sensor as a whole vary from device to device of the same model. As a consequence, each proximity sensor had to be adjusted during installation to respond to objects within the proper range of distances for that application. With some types of sensors, the installation setup involves physical adjustment of the sensor mounting to the piece of equipment on which it is being used. For other sensors, the setup is accomplished by electrically adjusting the signal processing circuit. In either case, some amount of manual effort by a technician is required to configure the sensor's operation. Even greater setup effort often is required when a sensor replaced one of a different type having performance characteristics which are more dissimilar.

Therefore, it is desirable to provide a mechanism that facilitates replacement of sensors.

SUMMARY OF THE INVENTION

A performance reference is created for proximity sensors which defines a relationship between a parameter of a sensor signal and a characteristic of an object to be detected. For example, the performance reference may be an equation or a set of data. Then for a given proximity sensor, a function is produced that characterizes deviation of performance of the given proximity sensor from the performance reference. As an example, performance data is empirically obtained from the given proximity sensor, and the function is derived based on deviation of the empirical performance data from the performance reference.

Subsequent operation of the proximity sensor generates a sensor signal and the function is employed to normalize the sensor signal to produce a normalized signal. The normalized signal is analyzed to determine whether an object is present.

This normalization method can be applied on a proximity sensor having a resonant circuit that when excited by a pulse generates a signal that has decaying oscillations. The number of oscillations with peaks above a predefined threshold varies with the presence of a metal object and as a function of the proximity of that object. The presence of a metal object can be determined by counting such oscillations and comparing the count to a defined limit.

This type of sensor is configured by specifying a reference distance value defining how close an object has to be in order for the sensor to indicate its presence. The reference performance data and the reference distance value are used to define a threshold count value. During subsequent operation of the sensor, the cycles of the oscillating signal which exceed a predefined signal level are counted to produce a signal count. The signal count is normalized using the function thereby creating a normalized count. The normalized count is compared to the threshold count value to determine whether an object is sufficiently close to the sensor to produce an active output signal.

DETAILED DESCRIPTION OF THE INVENTION

The present invention will be described in the context of an inductive proximity sensor that is located adjacent the area through which metal objects to be detected travel, so that the objects will pass within a predefined distance from the sensor. However, it should be understood that the inventive concept can be applied to other types of sensors.

Figure 1:
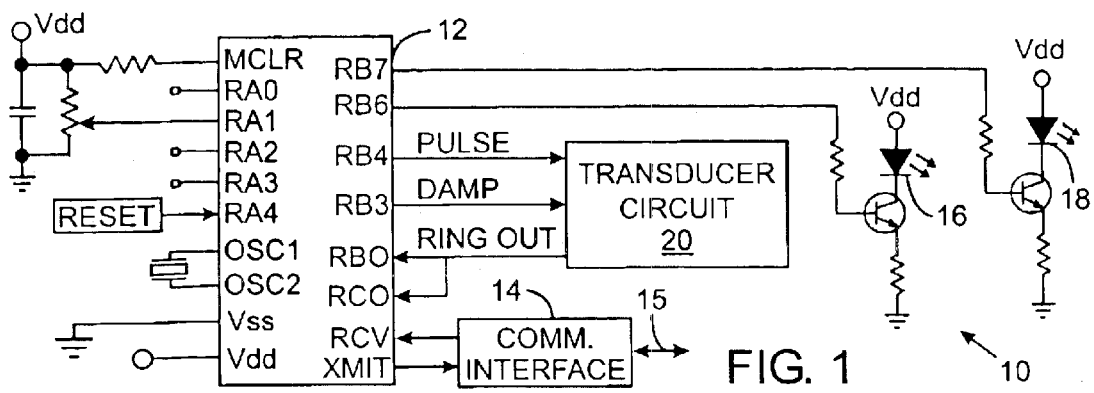
FIG. 1 is a block diagram of the electronic circuit of a proximity sensor according to the present invention.

With reference to FIG. 1, the electronic circuitry of a proximity sensor 10 includes a conventional microcomputer 12 which has an internal microprocessor and a memory. The memory stores the software to be executed and the data used by that software. The microcomputer 12 also has input/output ports for connection to external components, such as a pair of light emitting diodes 16 and 18 that indicate various operating conditions of the sensor. A serial output port (RB2) of the microcomputer 12 is connected to a bidirectional communication interface 14 which sends and receives data messages via a cable 15. As will be described, the proximity sensor sends a message over the cable 15 to indicate when an object has been detected. In addition, the cable 15 carries electrical power to the proximity sensor 10.

Figure 3:
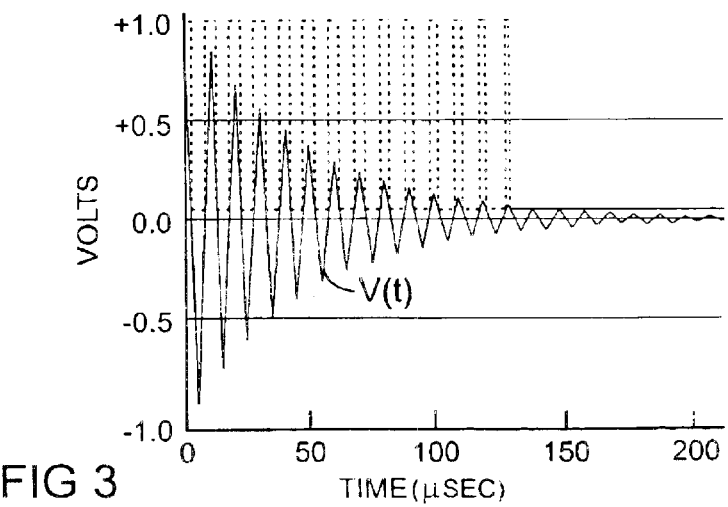
FIG. 3 illustrates a signal waveform in a section of the transducer circuit.

The microcomputer 12 also is connected to a transducer circuit 20, shown in detail in FIG. 3. In this latter circuit, a transducer coil 21 is connected in parallel with a capacitor 22 to form a resonant circuit 23. The transducer circuit 20 receives a signal, designated PULSE, from the microcomputer 12 at terminal 24. The PULSE signal is coupled through a first resistor 25 to a drive circuit 27 and specifically to the base of a first transistor 26 which also is connected to a source of a positive supply voltage (Vdd) by a first resistor 29. The emitter of the first transistor 26 is connected to the source of positive supply voltage (Vdd) by a second resistor 28. A blocking diode 30 couples the collector of the first transistor 26 to one side of both the resonant circuit 23, the other side of which is connected to circuit ground.

The resonant circuit 23 also is connected to an input node 32 of an optional amplifier 34 that serves to increase the sensitivity of the proximity sensor 10. The amplifier 34 includes a field effect transistor 35 and produces an amplified signal at an output node 36. The output node 36 is connected to a comparator 38 and more particularly to the non-inverting input of a differential amplifier 40. The inverting input of the differential amplifier 40 is connected to the wiper of a potentiometer 42 that is connected between the source of positive voltage Vdd and ground potential. A capacitor 44 also connects the inverting input of a differential amplifier 40 to ground potential. The potentiometer 42 allows adjustment of a threshold voltage used to discriminate the characteristics of an oscillating signal from the resonant circuit 23. The output of the differential amplifier 40 is a signal designated RING OUT which is applied to a pair of input ports of the microcomputer 12. One of those ports is an interrupt line which upon receiving an active RING OUT signal triggers a software routine that counts of pulses of the RING OUT signal applied at the other input port.

When the proximity sensor 10 is active, due to the application of power via cable 15, the microcomputer 12 periodically applies the PULSE signal to terminal 24 of the transducer circuit 20. The PULSE signal is a brief excitation pulse which momentarily turns on the first transistor 26 to apply a positive voltage pulse to the resonant circuit 23 formed by the transducer coil 21 and capacitor 22. This produces an oscillating signal in the resonant circuit 20.

At the termination of this excitation pulse, the resonant circuit's oscillations decay exponentially as shown by the dampened sinusoidal waveform in FIG. 3. It should be understood that there typically are a significantly greater number of oscillations than are illustrated. The rate of decay is a function of the numerical quality factor Q of the resonant circuit 23 which in turn is a function of the inductance and capacitance of that resonant circuit. The voltage peaks of the oscillating signal V(t) decay at the neper frequency of $e^{-\pi}$.

It can be proven that after Q number of cycles, the signal voltage has decayed to a value $e^{-\pi}$ which equates to 2.18 percent of the voltage applied to the resonant circuit by turning on the first transistor 26. Therefore, the number of positive peaks that are greater than the $e^{-\pi}$ value of V(t) denotes the Q of the resonant circuit. This, provides a very effective way to digitally measure the Q of the resonant circuit 23.

The inductance of the transducer coil 21 and thus the resonant circuit's Q factor changes when an metal object is present within the sensing range of the apparatus and the amount of that change is related to the distance between the transducer coil 21 and the object. Thus, the presence or absence of a metal object, as well as the distance to the object, can be determined by analyzing the characteristics of the exponentially decaying waveform of the signal from the resonant circuit 23.

For such analysis, the resonant circuit signal at the output of the amplifier 34 is applied to the comparator 38. The potentiometer 42 is set to apply a voltage to the inverting input of the differential amplifier 40 which corresponds to level $e^{-\pi}$ of the supply voltage Vdd that excited the resonant circuit. Thus, the differential amplifier 40 produces an output pulse whenever the oscillating signal at node 36 exceeds the $e^{-\pi}$ voltage level, as indicated by the dotted pulses in FIG. 3. Therefore, the number of pulses in the RING OUT signal from the comparator 38 varies and represents the Q factor of the transducer resonant circuit 23.

As noted previously, the Q factor of the resonant circuit 23 varies in response to the presence of a metal object and the distance between that object and the transducer coil. Specifically, when an metal object is present, the Q factor is lower and less pulses are passed by the comparator 38 than in the absence of a metal object. The dampening rate of the resonant signal also varies as a function of the distance between the transducer coil 21 and the metal object. The closer the object, the lower the Q factor and the more rapid the dampening. This also reduces the number of pulses which are passed by the comparator 38. As a consequence, there are fewer pulses with peaks above the $e^{-\pi}$ voltage level and thus fewer pulses of the RING OUT signal are produced by the comparator 38 as an object moves closer to the transducer coil 21. The RING OUT signal pulses are counted by the microcomputer 12 which thereby is able to determine whether a metal object is within the range of the proximity sensor 10 and the distance to that object. The pulse count forms a signal which subsequently is processed to determine the presence of an object.

Referring again to FIG. 1, the RING OUT signal is passed from the transducer circuit 20 to the microcomputer 12. An active ring output signal interrupts the microcomputer, which then executes an interrupt routine that counts the number of pulses in the RING OUT signal. The count then is translated into a numerical value corresponding to the distance that the object being detected is from the transducer coil 21. This translation is accomplished by a function which can be implemented by either an arithmetic equation which relates the pulse count to distance or by a lookup table that is addressed by the pulse count to retrieve an numerical distance value.

Figure 4:
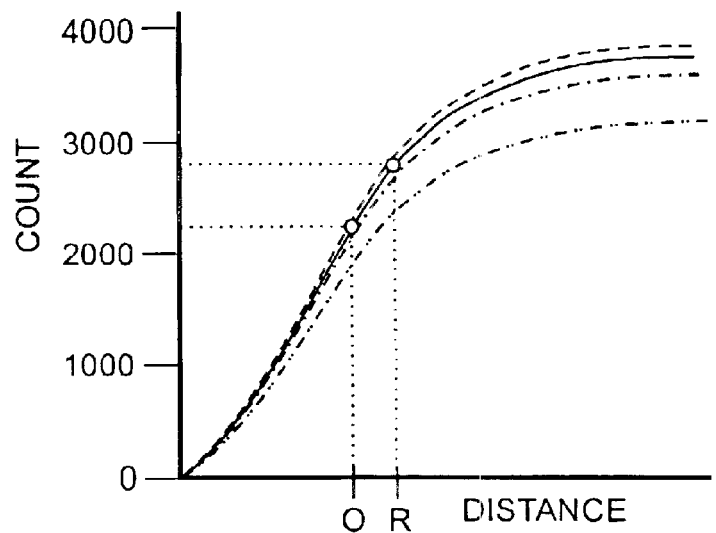
FIG. 4 graphically depicts a performance characteristic of several proximity sensors.

The relationship between pulse count and distance typically varies among sensors of a given type and more dramatically between different types of sensors. FIG. 4 graphically illustrates the relationship between the pulse count and the object distance for several sensors of the same model as indicated by the different broken lines. As can be seen from this graph, the pulse count increases with the distance that a metal object is from the transducer coil 21 and ultimately reaches a maximum count (approximately 4000 for example) when a metal object is not within the detection range of the sensor.

Each model of proximity sensor has a defined "operate point" O, or distance, that specifies how close to the transducer coil 21 an object has to be before the sensor produces an active output signal indicating the presence of that object. When the count is equal to or less then the operate point O, the microcomputer 12 issues an active output signal to the communication interface 14 which applies that signal to the cable 15, as shown in FIG. 1. When that object travels away from the transducer coil 21 and reaches a second distance referred to as the "release point" R, the microcomputer 12 terminates the active output signal, thereby indicating that the object is no longer within the sensing range of the proximity sensor 10. The operate and release points are defined by specific distance values stored within the memory of the microcomputer 12.

Because the performance varies among sensors of the same model, heretofore when a sensor was replaced in a machine, the mounting of the sensor had to be physically adjusted so that the operate and release points O and R were properly located with respect to the path of the objects being processed. This adjustment was often time consuming and physically difficult depending upon the location of the sensor on the machine. The present invention overcomes the problems associated with the variability of the performance characteristics of each sensor, not only among the same model, but also between different sensor models.

Figure 5:
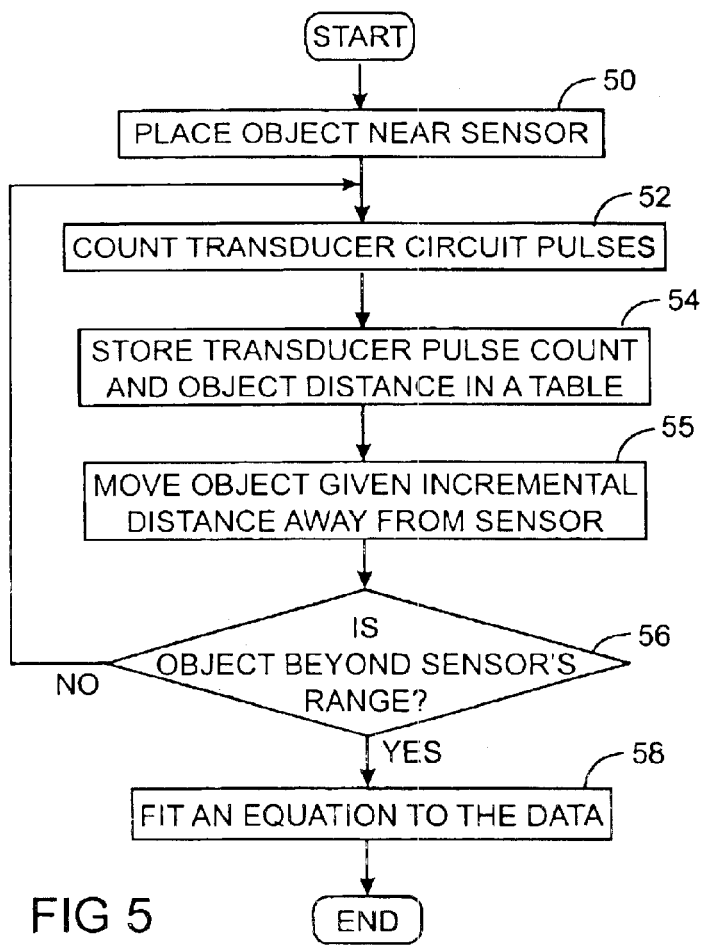
FIG. 5 is a flowchart representing a procedure for characterizing performance of a proximity sensor.

The present technique involves characterizing the performance of a sensor type to produce a performance reference in the form of a curve defining the relationship between pulse count and object distance. Then during manufacture, the performance of each sensor is normalized to the reference performance curve. Referring to FIG. 5, the performance characterization is performed by taking a sensor and placing a metal object at a known distance from the transducer coil 21 at step 50. The decaying resonant signal is processed to derive a pulse count at step 52 and that count and the associated distance are stored at step 54. The object is moved to a different distance from the sensor at step 55 and the process is repeated. Eventually at step 56 the object has been moved beyond the detection range of the sensor.

The resultant data provides an exemplary performance curve similar to those shown in FIG. 4. The performance curve from a single sensor can be used as a reference performance curve or data gathered from a plurality of exemplary sensors of the same model can be averaged to produce the reference performance curve, as depicted by the solid curve in FIG. 4. The result of the sensor characterization is a set of data representing the relationship of the transducer pulse counts to target distance throughout the operating range of the proximity sensor. This data can either be stored in a lookup table as defining the reference performance curve, or an equation fitting process can be employed at step 58 to develop an equation which is a best fit expression of the empirical data.

Then during manufacture of each sensor of this model type, each particular sensor is calibrated with respect to the reference performance curve. For example, the pulse count that is produced in a newly manufactured transducer in the absence of a metal object is compared to the maximum pulse count on the reference performance curve. This determines a gain factor which forms a function that is used to adjust the pulse count from the newly manufactured sensor to the pulse count on the reference performance curve. This gain factor is then stored within a memory location of the microcomputer 12 in the new sensor. This gain factor essentially normalizes the performance of this particular sensor to that of the other sensors of the same model.

This enables the operate and release points of a sensor to be programmed by inputting the object to sensor distance associated with each point. The configuration software routine in the sensor stores those distance values and the employs the distance values and the reference performance curve information, either in look-up table of equation form, to derive the corresponding normalized pulse counts. Those normalized pulse counts are stored in the microcomputer's memory as the threshold values for the operate and release points. Thus, when a sensor is replaced on a machine, the distance values for the operate and release points for that installation can be read from the old sensor and transferred into the new sensor via each device's network interfaces 14. Other conventional methods for transferring sensor data can be utilized, such as described in the aforementioned U.S. patent.

Figure 2:
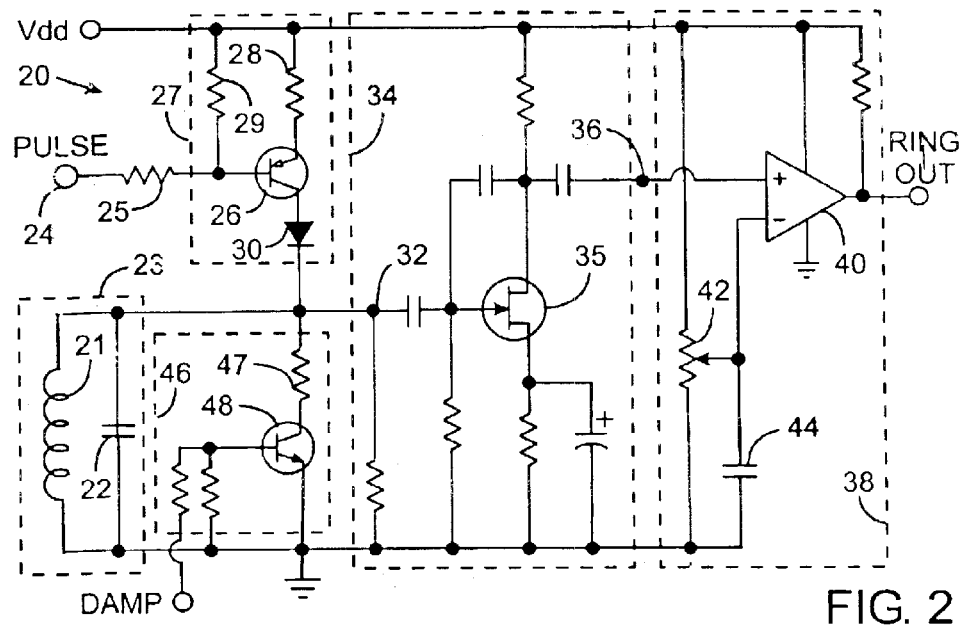
FIG. 2 is a schematic diagram of a transducer circuit in the proximity sensor.
Figure 6:
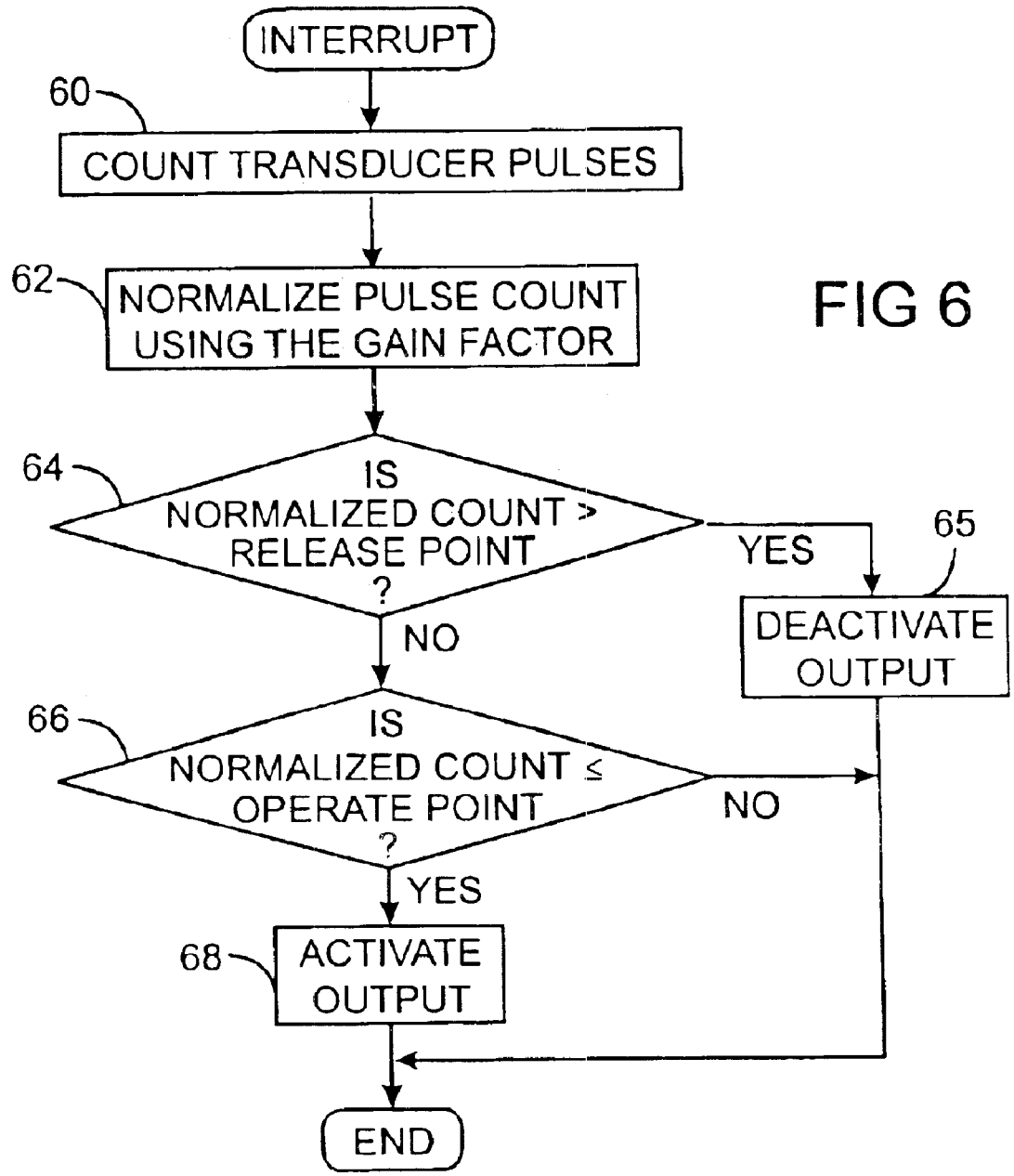
FIG. 6 is a flowchart illustrating the signal processing within the proximity sensor.

During operation of the proximity sensor 10 shown in FIGS. 1 and 2, the microcomputer 12 periodically activates the transducer circuit 20 with the PULSE signal which produces oscillations in the resonant circuit 23. The resultant ringing of the resonant circuit 23 interrupts the microcomputer 12 causing that latter device to execute an interrupt routine That interrupt routine is depicted by the flow chart of FIG. 6 and commences at step 60 by counting the pulses in that RING OUT signal from the transducer circuit 20. The interrupt routine recognizes that the ringing has ended when a predefined period of time elapses without receiving another pulse from the transducer circuit 20. The final pulse count is then normalized at step 62 by multiplying it by the gain factor stored in the microcomputer memory during manufacture of the sensor.

Then at step 64, the microcomputer 12 determines whether the normalized pulse count is greater that the threshold count stored for the release point. That relationship is true when an object is significantly far away from the transducer coil 21. In that event, the program execution branches to step 65 where the output from the microcomputer 12 to the network interface 14 is deactivated before the interrupt routine terminates. Otherwise, when the normalized count is equal to or less than the count associated with release point, the program execution advances from step 64 to step 66. At this juncture, a determination is made whether the normalized pulse count is less than or equal to the operate point, as occurs when an object is relatively close to the sensor 10. In that case, the program execution branches to step 66 where the output signal to the network interface 14 is activated. Otherwise, if the normalized count is greater than the operate point O and less than the release point R, the program execution terminates after step 66 without changing the status of the output signal.

Because the threshold values for the release point O and the operate point R are defined using the reference performance curve, two sensors having different individual performance characteristics can be easily configured to have substantially identical operation. Thus, physical adjustment of the mounting of a replacement sensor is not required. In fact, the sensor can have a rigid, nonadjustable mount as the configuration of the device for a particular installation is done electronically by setting the threshold counts for the release and operate points.

Although, the specific performance characteristics of a given sensor may differ from that normalized curve, as seen in FIG. 3, the sensor operation normalizes the raw count of pulses from the transducer circuit 20 into the equivalent count on the normalized curve. This process is equivalent to characterizing the performance of each sensor and utilizing the raw counts of that sensor which correspond to the desired distances.

The common reference performance curve can be used to equalize the operation of sensors of different models. However, the curves of one model of transducer may differ significantly from another model in terms of slope and break points, thus requiring a more elaborate normalization function and merely specifying a gain factor as is satisfactory to normalized sensors of the same model. Nevertheless any of several well known procedures can be employed to compare the actual performance curve of a sensor to a normalized curve and produce a function for normalizing the performance of that sensor. Thus, by normalizing different models of sensors to the same reference performance curve, a sensor of one model can be easily substituted for a sensor of another model, just as specific sensors of the same model can be substituted for one another as described above.

Alternatively, the count thresholds from the normalized performance curves can be converted to threshold values for a specific sensor which then are used during the operation of the sensor to determine whether an object is present. A particular sensor 10 is programmed by sending it a message which interrupts the microcomputer 12 and activates execution of another software routine. Referring to the flow chart of FIG. 7, this other interrupt routine commences at step 70, where a determination is made whether the communicated message contains a programming command or a request for configuration data from the sensor. Upon receipt of a programming command, execution of the routine branches to step 71 where a distance value contained in the message is stored in the memory of the microcomputer 12. Then, at step 72, the distance value and the normalized performance curve data is used to compute the normalized pulse count that corresponds to the received distance value. The gain factor then is employed at step 73 to convert the normalized pulse count to a specific pulse count for this particular sensor. At step 74, the sensor's specific pulse count is stored in the memory location for either the operating point or the release point as designated in the received message. The programming then terminates.

Figure 7:
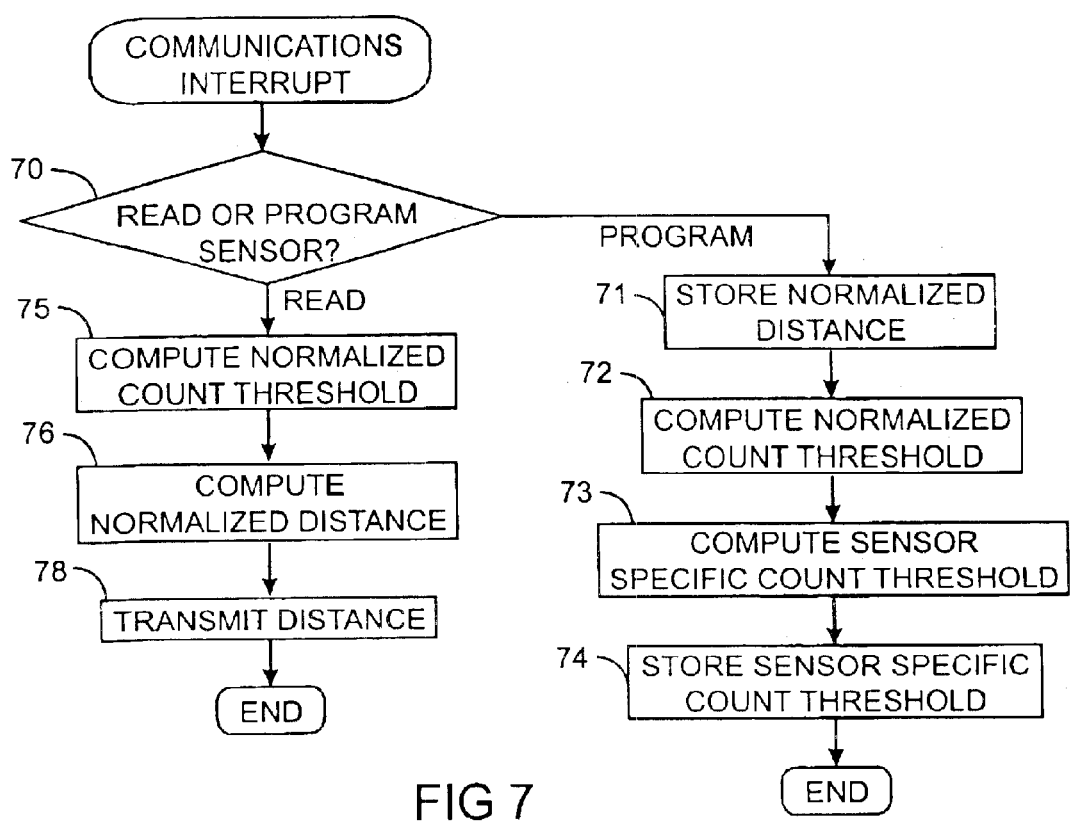
FIG. 7 is a flowchart of a routine which handles communication with the sensor.

The communication routine depicted in FIG. 7 also is employed at a later point and time to read the program data from the sensor to create an operational clone of this particular sensor. In the read mode of operation, the routine execution branches from step 70 to step 75, where the sensor specific pulse count for either the operate or release point is read from memory and the gain factor is utilized to convert the sensor specific pulse count to the normalized pulse count. The normalized pulse count and the normalized performance curve data are employed at step 76 to compute the associated normalized distance value. At step 78, the normalized distance value is transmitted from this sensor and transferred into another sensor to create a clone. Thus, the normalized distance value is used to program a given sensor, which then converts the normalized value into a sensor specific value for the operational characteristics of the given sensor.

Figure 8:
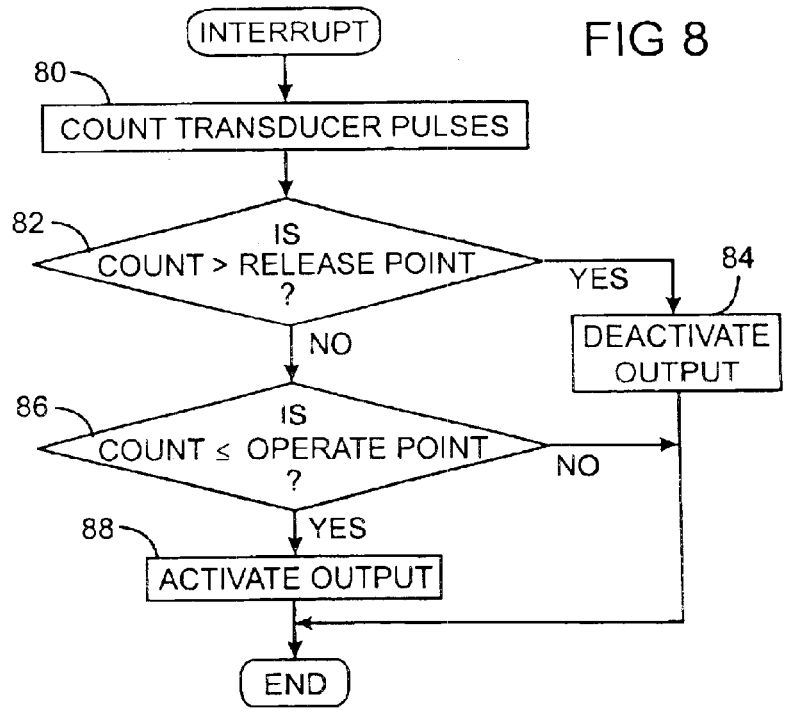
FIG. 8 is a flowchart depicting signal processing within a second embodiment of the proximity sensor.

As noted above, step 74 stores non-normalized pulse counts for the "operate" and "release" points thereby relieving the sensor from having to normalize the pulse counts each time the resonant circuit is excited. This pulse count procedure is depicted by the flowchart in FIG. 8 and commences when the microcomputer 12 is interrupted by the RING OUT signal on its interrupt input line. The procedure commences by counting the transducer pulses at step 80. The actual count of these pulses is then compared to the release point count at step 82 without any normalization. If the release point count is exceeded, the sensor is deactivated at 84 before the interrupt routine terminates. Otherwise, when the release point is not exceeded, the program execution advances to step 86 where the pulse count is compared to the operate point count. When the pulse count is less than the operate point count, indicating that an object is in close proximity to the sensor 10, a routine advances to step 88 where the output of the sensor is activated before the routine terminates.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method for operating a proximity sensor comprising:
   providing a performance reference defining a relationship between a parameter of a sensor signal and a characteristic of an object to be detected;
   deriving a function that specifies deviation of performance of the proximity sensor from the performance reference;
   providing a threshold value for the parameter;
   thereafter, operating the proximity sensor to produce the sensor signal which indicates whether the object is proximate to the proximity sensor;
   employing the function to normalize the sensor signal produced by operating the proximity sensor to produce a normalized signal; and
   comparing the normalized signal to the threshold value to determine whether an object is present.

2. The method as recited in claim 1 wherein the parameter is how many cycles of the sensor signal which exceed a threshold level.

3. The method as recited in claim 1 wherein deriving a function comprises:
   characterizing performance of the proximity sensor to develop sensor data defining a relationship between the parameter of the sensor signal produced by the proximity sensor and the characteristic of the object; and
   deriving the function based on deviation of the sensor data from the performance reference.

4. The method as recited in claim 3 wherein the function is an equation defining the relationship between the sensor data and the reference performance data.

5. The method as recited in claim 1 wherein the function is a gain factor indicating deviation between the sensor data and the reference performance data.

6. The method as recited in claim 5 wherein the parameter of the sensor signal is a count of cycles of the sensor signal which exceed a threshold level; and employing the function to normalize the signal comprises multiplying the count of cycles by the gain factor.

7. The method as recited in claim 6 wherein providing a threshold value comprises transferring data from another proximity sensor.

8. The method as recited in claim 1 further comprising defining a reference distance value; and wherein providing a threshold value comprises employing the reference performance data and the reference distance value to define the threshold value for the characteristic of an object to be detected.

9. The method as recited in claim 8 wherein defining a reference distance value comprises obtaining a value from another proximity sensor.

10. A method for operating a proximity sensor comprising:

provingreference performance data defining a relationship between a numerical value produced from a sensor signal and distance to an object to be detected;

characterizing performance of the proximity sensor to develop sensor data defining a relationship between a numerical value produced from the sensor signal of the proximity sensor and distance to an object to be detected;

deriving a function that specifies deviation of the sensor data from the reference performance data;

thereafter, operating the proximity sensor to produce a given numerical value;

employing the function to normalize the given numerical value, thereby producing a normalized value; and determining, in response to the normalized value, whether an object is present.

11. The method as recited in claim 10 wherein the numerical value is how many cycles of the sensor signal exceed a threshold level.

12. The method as recited in claim 10 wherein the function is an equation defining the relationship between the sensor data and the reference performance data.

13. The method as recited in claim 10 wherein the function is a gain factor; and employing the function comprises multiplying the given numerical value by the gain factor.

14. The method as recited in claim 10 further comprising defining a reference distance value, and employing the reference performance data and the reference distance value to define a threshold level for the numerical value; and wherein determining whether an object is present also is in response to the threshold level.

15. The method as recited in claim 14 wherein defining a reference distance value comprises obtaining a distance value from another proximity sensor.

16. A method for operating a proximity sensor comprising:

providing reference performance data defining a relationship between a count of sensor signal cycles and distance to an object to be detected;

characterizing performance of the proximity sensor to develop sensor data defining a relationship between a count of cycles of a signal of the proximity sensor and distance to an object to be detected;

deriving a function that specifies deviation of the sensor data from the reference performance data;

specifying a reference distance value;

employing the reference performance data and the reference distance value to define a threshold count value;

thereafter, applying a stimulation pulse to a resonant circuit of the proximity sensor to generate an oscillating signal;

counting cycles of the oscillating signal which exceed a predefined signal level, thereby producing a signal count;

determining whether an object is present wherein such determination employs the function, the signal count and the threshold count value.

17. The method as recited in claim 16 wherein determining whether an object is present comprises:

employing the function to normalize the signal count, thereby producing a normalized count; and comparing the normalized count to the threshold count value.

18. The method as recited in claim 17 wherein the function is a gain factor; and employing the function to normalize the signal count comprises multiplying the signal count by the gain factor.

19. The method as recited in claim 16 wherein determining whether an object is present comprises:

employing the function to convert the threshold value into an adjusted threshold; and comparing the signal count to the adjusted threshold.

20. The method as recited in claim 16 wherein specifying a reference distance value comprises obtaining the reference distance value from another proximity sensor.

* * * * *